Patented Apr. 1, 1941

2,236,965

UNITED STATES PATENT OFFICE 2,236,965

CHEMICAL PROCESS AND APPARATUS

Dale F. Babcock, Wilmington, Del., assignor to E. I. du Pont de Nemours & Company, Wilmington, Del., a corporation of Delaware Application June 10, 1938, Serial No. 212,906

17 Claims. (Cl. 62—122)

This invention relates to the recovery of concentrated acetylene gas from admixture with other gases, and more particularly to the recovery of acetylene from mixtures containing ethylene together with hydrogen and with other hydrocarbons boiling above and below acetylene.

Until recently all acetylene was manufactured from calcium carbide but its use for chemical synthesis has created such a demand that attempts have been made to obtain it from other sources. Most of these attempts have been in the field of high temperature cracking of gaseous or liquid hydrocarbons, usually by means of an electric arc. The gas produced by this cracking step consists chiefly of hydrogen, ethylene, and acetylene but contains in addition small quantities of other hydrocarbons boiling above and below acetylene. These hydrocarbons are mostly unsaturated and consist chiefly of ethylene, propylene, butylenes, methyl acetylene, and diacetylene. There are many known ways of partially removing the hydrocarbon impurities in order to concentrate the acetylene but no known process discloses a complete operation for the removal of all of these impurities and at the same time separates highly concentrated acetylene gas.

This invention has as its object the recovery of concentrated acetylene gas from admixture with other gases, especially gases including ethylene. A further object is the production of concentrated acetylene gas by removing same from admixture with other hydrocarbons and hydrogen. A still further object is the recovery of acetylene from gaseous products obtained by cracking oils at temperatures such as are obtainable in the electric arc. A still further object is the separation of acetylene, contaminated only by any ethane that may be present, from hydrogen and higher boiling hydrocarbons. Another object is the starting of a rectifying column for the separation of liquid acetylene in such a manner as to prevent the freezing of acetylene and under conditions that will reduce the explosive hazard. Still another object is to improve the separation of components of a fluid mixture by rectification, especially the separation of acetylene from ethylene. Other objects will appear hereinafter. These objects are accomplished by the following invention.

The gas mixture containing acetylene and gases boiling above and below acetylene are treated under such conditions as will cause those components less volatile than acetylene to be separated from acetylene and the components more volatile than acetylene. This may be done by a low temperature rectification of the gaseous mixture or by scrubbing the gaseous mixture with a non-selective solvent. After the removal of those components less volatile than acetylene, the resulting gas is rectified by condensing a mixture of acetylene and ethylene at one pressure, partially separating the lower boiling gases from same, and then rectifying the acetylene-ethylene mixture preferably at a lower pressure so as to separate pure acetylene as a liquid and ethylene, together with any more volatile components remaining therein, as a gas. In order to aid in this rectification step the ethylene may be liquefied and returned to either or both the condensing step and the rectification step.

This invention also concerns the starting of the rectifying column in which the acetylene is separated as a liquid from gases more volatile than acetylene. The starting may be accomplished either by introducing into said column prior to the introduction of the acetylene mixture to be rectified a normally gaseous material which on cooling to $-110°$ C. under normal rectification pressure will produce a liquid fraction essentially free of solid material or when the gases to be rectified contain sufficient ethylene, by maintaining a temperature in the column no colder than $-80°$ C. until reflux is established, then slowly reducing the temperature to the desired conditions.

Figure 1:
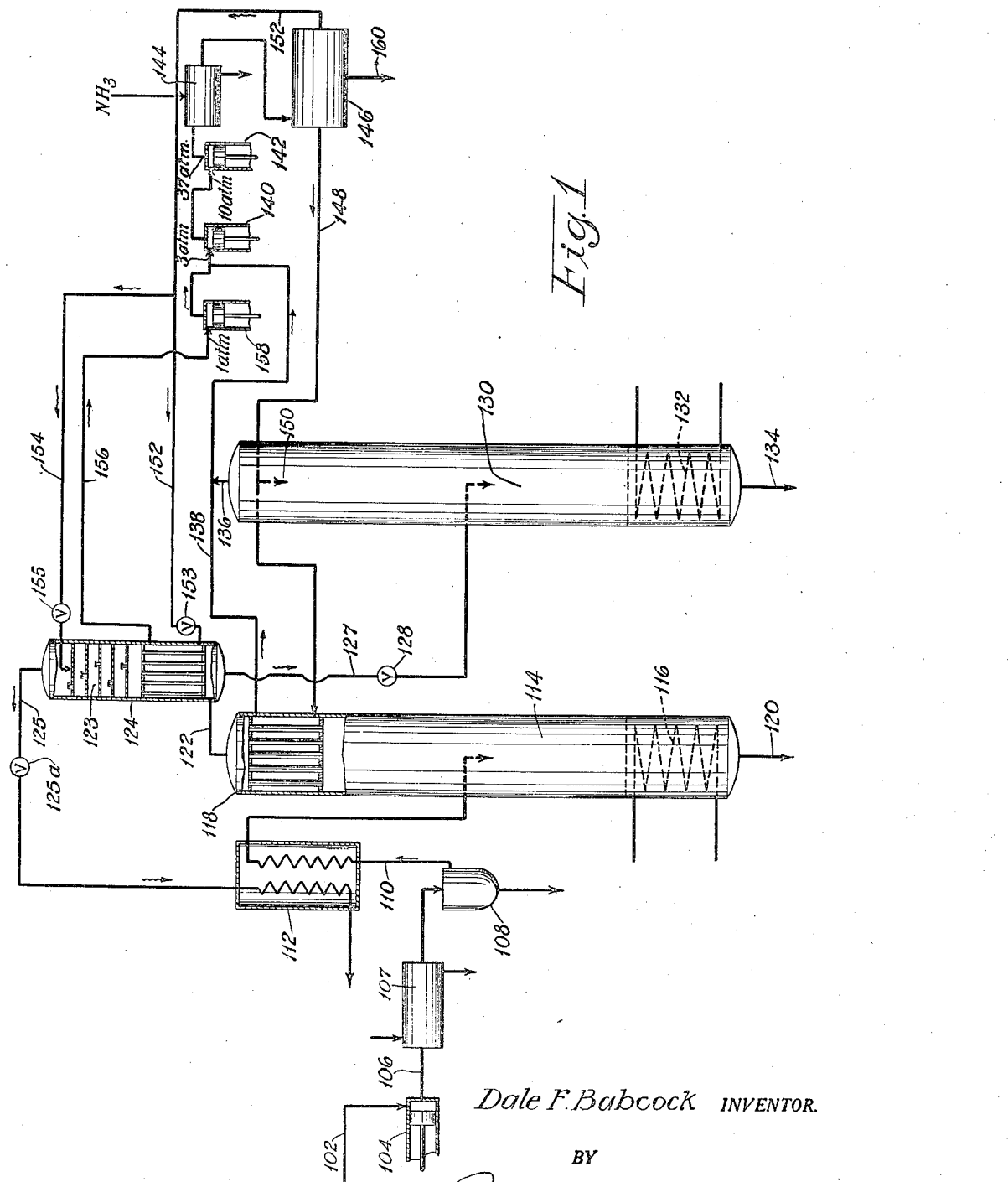
Figure 1 is a flow sheet of one modification of the process and apparatus for the purification of acetylene.

For the purpose of simplifying the terminology used herein and in the claims the components more volatile than acetylene will be termed the "heads" and the components less volatile than acetylene will be termed the "tails."

The following describes several embodiments of the applicant's invention as represented by the two figures shown in the drawings. It is to be understood that this description is merely illustrative and not intended to limit the invention in any way.

Referring to Figure 1 of the drawings, a crude gas generated by operating an electric arc submerged in oil and thoroughly dried by passing same over alumina gel was introduced into the system via conduit 102. The gas passed into multiple stage compressor 104 where its pressure was increased to about 11 atmospheres absolute. The crude gas was discharged from the compressor through conduit 106 and passed through cooler 107 into trap 108 where any condensed liquids contained therein were removed from the crude gas. This crude gas had the following composition:

| | Per cent | |
|---|---|---|
| Hydrogen | 52.7 | |
| Methane | 6.0 | heads |
| Ethylene | 6.0 | |
| Acetylene | 28.0 | |
| Propylene | 1.2 | |
| Methyl acetylene | 1.2 | |
| Butylenes | 1.2 | tails |
| Diacetylene | 2.5 | |
| Other hydrocarbons | 1.2 | |

The gas mixture leaving trap 108 via conduit 110 passed to heat exchanger 112, where it was cooled and then introduced into the rectifying column 114. Here the mixture was rectified by heating the fluid mixture in the calandria 116 at the bottom of the column to a temperature of about +15° C. and by cooling the condenser 118 at the top of the column to furnish reflux liquor to the column at a temperature of about −60° C. Under these conditions the mixture known as "tails" was withdrawn as a liquid through conduit 120 at the bottom of the column and the "heads" together with the acetylene were withdrawn as a gas from the top of the rectifying column through conduit 122.

The gaseous fraction from conduit 122 passed into a backward return condenser 124 operated at substantially the same pressure as column 114. This condenser was cooled by expanding liquid ethylene from conduit 152 through expansion valve 153 into the condenser shell where it evaporated under a pressure of one atmosphere. The ethylene vapor produced by this evaporation passed through conduit 156 to the first stage of ethylene compressor 158 where it was compressed to three atmospheres and combined with the vapors issuing from 118 and 138.

The evaporation of ethylene under one atmosphere pressure produced a temperature of −103° C. which was sufficient to cool the high pressure gas rising through the tubes of condenser 124 and entering rectifying section 123 to a temperature of −100° C. This high pressure gas was further cooled in rectifying section 123 by contacting it with liquid ethylene which was expanded into the top of rectifier 123 through conduit 154 and expansion valve 155. The evaporation of this ethylene produced a temperature of approximately −106° C. at the top of the rectifier. This liquid ethylene condensed acetylene and ethylene from the gaseous fraction. The lower boiling gases were expanded from the top of condenser 124 through valve 125a and by way of conduit 125 passed through heat exchanger 112 and out of the system.

The acetylene and ethylene liquid mixture containing a small quantity of hydrogen and methane was removed from the base of condenser 124 by way of conduit 127. Pressure was reduced on the mixture by the expansion valve 128 to a pressure approximating three atmospheres absolute. The resulting fluid mixture was then introduced into rectifying column 130.

Column 130 was operated by heating the fluid in calandria 132 at the bottom of the column at a temperature of approximately −60° C. and by introducing liquid ethylene at the top of the column via spray 150, which liquid ethylene boiled at a temperature of approximately −80° C. Under these conditions it was possible to maintain a liquid mixture of ethylene and acetylene throughout the column and separate substantially pure acetylene as a liquid at the bottom of the column by way of pipe 134. The ethylene containing approximately 1% of hydrogen and methane not removed by condenser 124 passed out of the column as a gas by way of conduit 136. From conduit 136 this gas passed into conduit 138 and thence to the second stage 140 of a three-stage compressor.

This second stage compressed the ethylene from the intake pressure of 3 atmospheres absolute to an intermediate pressure of 10 atmospheres absolute and thence to a third stage 142, where the pressure was increased to 37 atmospheres absolute. From the third stage of the compressor the ethylene passed through the ammonia cooler 144, where it was liquefied and delivered to the ethylene receiver 146.

Part of the liquid ethylene was returned to the rectifying column 130 via conduit 148 and spray 150. Also via conduit 148 liquid ethylene was introduced into the condenser 118 of the rectifying column 114. Here the ethylene was permitted to evaporate at a pressure of about three atmospheres absolute in order to maintain the desired temperature conditions in the condenser. The ethylene vapors were returned from the condenser 118 via conduit 138 to the second stage 140 of the three stage compressor.

Liquid ethylene from the receiver 146 was also introduced via conduit 152 into the shell of the backward return condenser 124. Here it was permitted to evaporate at a pressure of about one atmosphere absolute and the vapors evolved were conducted via conduit 156 through the first stage 158 of the three-stage compressor. This liquid ethylene in the backward return condenser 124 boiled at a temperature of about −103° C. which was sufficient to lower the temperature of the vapors passing through the backward return condenser to about −100° C. Liquid ethylene from conduit 152 was also introduced via conduit 154 into the top of rectifying section 123, as has previously been explained.

This liquid ethylene lowers the temperature of the outcoming gas to nearly −106° C., the temperature at which the acetylene content of the vent gases approaches zero. The ethylene in turn is vaporized and passes out of the system via conduit 126, together with the lower boiling gases. In this manner a certain amount of ethylene is consequently lost for further recycle to the refrigeration system. Any liquid ethylene accumulating in the system in excess of the amount lost in condenser 124 may be withdrawn from receiver 146 via conduit 160 and thus recovered.

Due to the extreme difficulty in separating the last traces of acetylene from the ethylene vapor leaving the top of rectifier 130, this fraction ordinarily contains a small quantity of acetylene. However, the production of 99+% acetylene at the base of the rectifier is consistently attained.

In the above described process the liquid from the base condenser 124 is expanded directly into column 130 through valve 128. The composition of this liquid is approximately 1% methane and hydrogen, 20% ethylene, and 79% acetylene. The presence of this 1% of hydrogen and methane is undesirable in operation as it collects in the ethylene refrigeration cycle as a difficultly condensable gas. This increases the discharge pressure on the ethylene compressor. The process may be modified, if it is desirable, so as to eliminate the presence of this 1% of hydrogen and methane. This may be accomplished by inserting immediately after the expansion valve 126 a gas and liquid separator and recycling back to the crude gas compressor 104 the vapors separated. In this way the liquid on expansion from 11 atmospheres absolute to three atmospheres absolute through valve 128 will be partially vaporized and this vapor will contain essentially all of the methane and hydrogen originally present in the 11 atmosphere liquid. The liquid separated in the gas and liquid separator is conducted to the rectifying column 130 for processing as indicated above. If this modification or its equivalent is not used, then a vent line should be constructed, preferably at the top of receiver 146 so that the ethylene gas containing the hydrogen and methane may be bled off when the pressure becomes too high.

Figure 2:
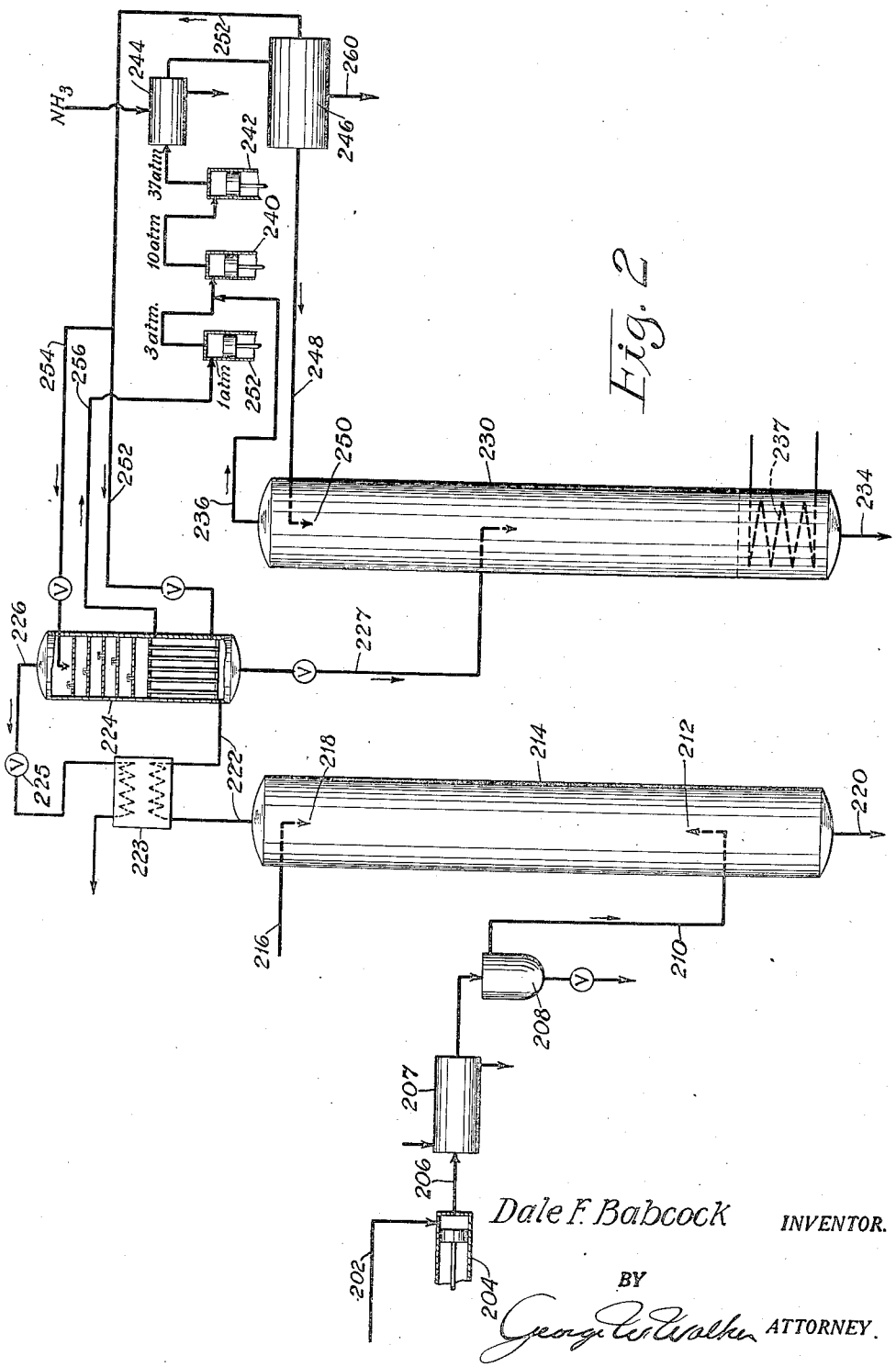
Figure 2 is a flow sheet of a process and apparatus of a second modification of this invention. This figure pertains to an apparatus similar in function to that shown in Figure 1 with the exception that the components less volatile than acetylene are removed by the scrubbing of the incoming gas with a non-selective solvent whereas in Figure 1 these components are removed by rectification.

Another modification of the invention described herein is embodied in Figure 2. Here the crude gas, after previously being dried, was introduced into the system via conduit 202 to compressor 204 where the pressure was increased to about 11 atmospheres absolute. The gas from the compressor 204 was conducted via conduit 206 through cooler 207 to trap 208, where any oil contained therein which had condensed was removed. The gas mixture was then passed from trap 208 via conduit 210 and outlet 212 into the bottom of the oil scrubber 214. Oil was admitted into the top of the oil scrubber via conduit 216 and spray 218. This oil is non-selective for the absorption of acetylene and therefore dissolved out the tails from the incoming gas. The heads together with the acetylene were conducted from the oil scrubber 214 via conduit 222. The oil containing the components known as tails were removed from the bottom of the scrubber 214 via conduit 220. This oil may be treated to remove the tails and recycled in the system or used as a fuel or disposed of in any other economical manner. The fraction containing the heads and acetylene, as conducted from the gas scrubber 214 via conduit 222, was similar in composition to the fractions conducted from the rectifying column 114 via conduit 122, as shown in Figure 1. This gas in conduit 222 passes through the heat exchange 223 and is processed in the same manner as disclosed in Figure 1, the remaining apparatus shown being identical with that of Figure 1 and carrying the same identification numbers except that in Figure 2 they are of the order of 200. The detailed description of the remainder of this apparatus and process will therefore not be repeated herein.

The separation of acetylene as a liquid fraction by rectification from gases containing considerable hydrogen and/or other gases boiling below acetylene offers considerable difficulty because acetylene freezes at −81° C. and the solid has a vapor pressure of one atmosphere at −84° C. The coldest point in a rectifying column designed to deliver pure liquid acetylene at the base by operating under rectifying conditions will be in a refrigerated reflux condenser at the top. The starting of such a column, as well as its operation, presents a difficulty because if the temperature of the coldest point is chosen above the freezing point of acetylene, the pressure required to avoid serious losses of acetylene becomes very high so that it is necessary to operate in the pressure range where acetylene gas is an explosion hazard. Such a column must be operated at some point below the freezing point of acetylene to maintain a safe partial pressure of acetylene. It was found that in this pressure range it is not practicable to separate pure acetylene at all unless the crude gas mixture contained ethylene. When ethylene is present, then liquid mixtures of acetylene and ethylene can be condensed under rectifying conditions at temperatures below the freezing point of acetylene. But even 50% ethylene in acetylene freezes around −90°, so that starting a column by simply cooling down the gas will plug it with solid frozen gases before the required liquid-composition concentration gradient can be established.

The present invention is therefore concerned with methods of starting a rectification column designed to separate pure liquid acetylene from mixtures with ethylene and lower boiling gases. Several methods have been devised, among these being the following:

Method 1

A gas mixture comprising all the constituents in substantially the same ratio as contained in the crude acetylene gas, with the exception that ethane is substituted for acetylene, is used to start the column. As soon as the column begins to separate pure liquid ethane at the bottom, then ethane in the incoming gas is gradually replaced by acetylene until the gas mixture becomes of the same composition as that of the crude gas. Then crude gas can be substituted for the synthesized composition.

As a specific example of this method a gas containing 36% $C_2H_6$, 8% $C_2H_4$, and rest substantially hydrogen was compressed to 150 pounds per square inch gage pressure, cooled to −60° C. and introduced to the middle of a column. The top of the column was cooled to −100° C., rectifying conditions were established, and liquid ethane boiling at −33° drawn from the bottom of the column. Then crude acetylene gas generated by operating an electric arc under oil was gradually substituted for the synthetic mixture. This gas contained 28% to 30% $C_2H_2$, 8% $C_2H_4$, 5% $CH_4$, and the rest substantially hydrogen. Eventually pure acetylene was delivered from the bottom of the column without any significant changes in temperature at any point in it. Previous attempts to start the column under the same conditions without using the synthetic mixture had always resulted in blocking up by freeze-up in the condenser.

Method 2

The column is equipped for step-wise refrigeration at the top. Crude acetylene gas containing ethylene is introduced and refrigeration applied to adjust the coldest temperature slightly above the freezing point of acetylene. In this way acetylene-ethylene liquid mixtures partially condense and rectification conditions are established but with heavy losses of acetylene out the top. Then refrigeration is increased to lower the temperature at the top until the acetylene losses are reduced to a small value. In this way acetylene-ethylene liquid mixture compositions are established in the upper cold column that do not freeze, pure liquid acetylene is recovered at the bottom, and ethylene along with other gases passes out the top.

As a specific example of this method a crude gas from the arc containing 25% $C_2H_2$, 7% $C_2H_4$, 5% $CH_4$ and rest substantially hydrogen was compressed to 150 pounds per square inch gage, cooled to —60° C. and introduced to the middle of a column. The top of the column was cooled to —78° C., rectifying conditions established, and liquid acetylene established at the base, boiling at —28° C. The out-gas at the top analyzed 6.7% $C_2H_2$, showing a large loss of acetylene. Then the top was gradually cooled to —100° C. without a freeze-up and the column operated ten hours with the top at —100° C., the base at —28° C. The analysis of out-gas from the top showed 0.7% $C_2H_2$ and that of the gas from evaporating the liquid acetylene drawn out at the bottom 97.8% $C_2H_2$.

Method 3

An alternate method of producing a satisfactory start-up is to cool the column to say —50° C. by spraying into the top liquid ethylene under ten atmospheres pressure and filling the top plates with this liquid. The crude acetylene gas can then be introduced at almost full flow since the high ethylene concentration would prevent freezing. This method would ordinarily be preferred in a plant because of the increased availability of ethylene over ethane and because of the reduced loss of acetylene by this method.

As the drawings are purely diagrammatical, the equivalents of the various pieces of apparatus shown may be used; for example, the compressor 104 in Figure 1 is shown as a single stage compressor. It is not intended that the process and apparatus be so limited. The figure in the drawing merely represents the function of compressing the gases. When the incoming gases are at atmospheric pressure and the pressure must be increased to 11 atmospheres, a two or three-stage compressor would be required with water coolers between each stage. Similar type changes can be made in the other pieces of apparatus without departing from the spirit of the invention. Such changes are within the skill of those versed in the art.

In the present process it is essential that ethylene be present in the gases entering the condensers 124 of Figure 1 and 224 of Figure 2. The presence of ethylene is necessary in order to avoid the freezing of acetylene. It is not essential that ethylene be added or that it be sprayed into the system as disclosed if the raw gas contains enough ethylene to prevent this freezing of acetylene. However, the return of the more volatile ethylene to the rectification and condensation step is beneficial and does materially aid in the complete recovery of the acetylene.

In the description of the process as outlined above, it will be noted that the crude gas is dried prior to introducing same into the system. This drying may be accomplished by passing the gas over calcium carbide or the liquefaction of the water by cooling.

One of the essential features of the rectification process in which acetylene is separated as a substantially pure fraction is the presence in the rectifying column of sufficient ethylene to prevent the freezing of acetylene. It has been found that the progressively increasing ethylene concentration that is produced as the temperature in the rectifying column approaches —106° C. is almost automatically maintained by the reflux which is necessary for successful fractionation and it is also found that this plate-to-plate concentration is sufficiently high in each instance in ethylene to prevent freezing. If ethylene is not present in the incoming gas it may be added to the acetylene at any point in the system prior to the rectification of the acetylene-ethylene mixture. In order to avoid polymerization and possible explosion by heating the base of column 114 (Figure 1) to a temperature required to free the liquid tails of acetylene, this liquid need only be concentrated to 75% tails and 25% acetylene. Such a concentration will require a temperature of from about 12° C. to about 20° C. The acetylene in the tails, which amounts to nearly 5% of the total produced, can be recovered by expanding the liquid to atmospheric pressure, separating the flash gas from the liquid, and recycling this flash gas from the crude gas to compressor 104 in Figure 1.

The first rectification column in the processes disclosed in Figures 1 and 2 may be operated at pressures between four atmospheres absolute and 18 atmospheres absolute. The temperature conditions used in the calandria and condenser of the column will of course vary with the pressure at which the column operates.

It is preferred from the standpoint of safety to operate the rectifying column in which the acetylene is separated as a liquid from an acetylene-ethylene mixture—(see column 130 (Figure 1) and column 230 (Figure 2))—at a pressure between about one or 1⅓ atmospheres absolute and about 6 atmospheres absolute, but higher pressures may be used if desired. For example, the rectification in the columns 130 (Figure 1) and 230 (Figure 2) is operative between 1.1 atmospheres and about 35 atmospheres, the lower pressure limit being fixed at the freezing of $C_2H_2$ at the temperature of operation. It is also possible to operate the condensers 124 (Figure 1) and 224 (Figure 2) at a lower pressure than rectifying columns 130 and 230. Practically, the pressure in each of the condensers 124 and 224 is higher in order to avoid the use of a pump or other means for conveying the fluid from 124 to 130 and from 224 to 230.

The cooling at the top of the rectifying column need not be produced by a direct spray of liquid ethylene although this is the preferred method. The cooling may be produced by one or more condensing means in at least one of which the cooling fluid is in heat exchange relationship with but out of contact with the gases being cooled.

It is apparent that many widely different embodiments of this invention may be made without departing from the spirit and scope thereof and therefore it is not intended to be limited except as indicated in the appended claims.

I claim:

1. The process for recovering acetylene from admixture with higher and lower boiling components which comprises treating the mixture so as to separate acetylene and the lower boiling components from the higher boiling components, cooling the gaseous fraction containing the acetylene in at least two stages, the last stage of which is accomplished by contacting the gas with liquid ethylene, said cooling being applied in such a manner that acetylene and a portion of the ethylene is liquefied, separating said acetylene-ethylene liquid from the remaining gaseous fraction, rectifying the acetylene-ethylene mixture at a pressure lower than that used for condensing the acetylene, said rectification being carried out so as to separate acetylene as a liquid and ethylene as a gas, and compressing and condensing the ethylene gas for re-use in said cooling step.

2. The process for the recovery of acetylene from admixture with higher and lower boiling components including ethylene, which comprises rectifying the mixture so as to separate acetylene and the lower boiling components as a gas and the higher boiling components as a liquid, then cooling the gaseous fraction containing the acetylene in at least two stages, the last stage of which is accomplished by contacting the gas with liquid ethylene, said cooling being applied in such a manner that acetylene and a portion of the ethylene is liquefied, separating said acetylene-ethylene liquid from the remaining gaseous fraction, rectifying the acetylene-ethylene mixture so as to separate acetylene as a liquid and ethylene as a gas.

3. The process in accordance with claim 2 characterized in that the ethylene separated in the last step is compressed, cooled to condense to liquid ethylene and re-introduced into the system so as to condense a portion of the ethylene-acetylene mixture.

4. The process for the recovery of acetylene from admixture with hydrogen, higher boiling hydrocarbons, and lower boiling hydrocarbons, including ethylene, which comprises rectifying said mixture at a pressure of about 11 atmospheres absolute so as to separate acetylene and the lower boiling hydrocarbons as a gas and the higher boiling hydrocarbons as a liquid, said rectification being effected by boiling the liquid at the base of the rectifying column at a temperature of about +15° C. in order to expel the gaseous fraction and by condensing the reflux liquid at the top of the rectifying column at a temperature of about −60° C., then cooling the gaseous fraction containing the acetylene to about −106° C. in at least two stages, the last stage of which is accomplished by contacting the gas with liquid ethylene, said cooling being applied in such a manner that acetylene and a portion of the ethylene is liquefied, separating said acetylene-ethylene liquid from the remaining gaseous fraction, reducing the pressure on the acetylene-ethylene mixture to about three atmospheres absolute, rectifying the resulting fluid mixture so as to separate acetylene as a liquid and ethylene as a gas, said rectification being effected by boiling the liquid acetylene at the base of the rectifying column at a temperature of about −63° C. and by condensing the reflux liquid at the top of the rectifying column at a temperature of about −80° C., said temperature being effected by spraying liquid ethylene into the top of said rectifying column, compressing and cooling the gaseous ethylene separated at the top of the rectifying column so as to liquefy same, and recycling liquid ethylene by spraying same into the gaseous fraction obtained in the first rectification step and also into the top of the second rectifying column.

5. A process for the separation of acetylene from admixture with gases more volatile than acetylene which comprises rectifying said mixture in the presence of ethylene so as to obtain a liquid ethylene-acetylene mixture and then rectifying said liquid mixture under conditions that will effect the separation of acetylene as a liquid from the ethylene as a gas, said rectification process being further characterized in that it is started by introducing into said rectification system prior to the rectification of the acetylene mixture a normally gaseous material which on cooling to −110° C. under normal rectification pressure will produce a liquid fraction essentially free of solid material.

6. A process for the separation of acetylene from admixture with gases more volatile than acetylene which comprises rectifying said mixture in the presence of ethylene so as to obtain a liquid ethylene-acetylene mixture and then rectifying said liquid mixture under conditions that will effect the separation of acetylene as a liquid from the ethylene as a gas, said rectification process being further characterized in that it is started by introducing into said rectification system prior to the rectification of the acetylene mixture a normally gaseous material having a boiling temperature within the range of −40° to −110° C. and which would not produce a solid phase in this temperature range.

7. A process for the separation of acetylene from admixture with gases more volatile than acetylene which comprises rectifying said mixture in the presence of ethylene so as to obtain a liquid ethylene-acetylene mixture and then rectifying said liquid mixture under conditions that will effect the separation of substantially pure acetylene as a liquid from the ethylene as a gas, said rectification process being further characterized in that it is started by maintaining a condensing temperature in said rectification system between −60° C. and −80° C. until reflux is established and then slowly reducing the temperature to the desired conditions.

8. A process for the separation of acetylene from admixture with gases more volatile than acetylene which comprises rectifying said mixture in the presence of ethylene so as to obtain a liquid ethylene-acetylene mixture and then rectifying said liquid mixture under conditions that will effect the separation of acetylene as a liquid from the ethylene as a gas, said rectification process being further characterized in that it is started by establishing a liquid reflux comprising essentially ethylene in the rectification system prior to the introduction of the acetylene containing gas.

9. In the process of starting a rectification system for the separation of acetylene from a mixture containing gases more volatile than acetylene said mixture containing acetylene in such proportion that a solid component is liable to form in the temperature zone of normal rectification, the improvement which comprises introducing into said rectification system prior to the rectification of the acetylene mixture a normally gaseous material which on cooling to −110° C. under normal rectification pressure will produce a liquid fraction essentially free of solid material.

10. In the process of starting a rectification system for the separation of acetylene from a mixture containing gases more volatile than acetylene said mixture containing acetylene in such proportion that a solid component is liable to form in the temperature zone of normal rectification, the improvement which comprises introducing into said rectification system prior to the rectification of the acetylene mixture a normally gaseous material having a boiling temperature at atmospheric pressure within the range of −40° to −110° C. and which would not produce a solid phase in this temperature range.

11. The process of starting a rectification system for the separation of acetylene from admixture with other gases which comprises establishing a liquid reflux comprising essentially ethylene in the rectification system prior to the introduction of the acetylene-containing gas.

12. The process of starting a rectifying column for the rectification of a mixture comprising acetylene and ethylene, which comprises adjusting the temperature in the condenser of the column to a point above the freezing point of acetylene but low enough to partially condense a mixture of acetylene and ethylene, then gradually lowering the temperature of the condenser and thereby establishing a concentration gradient of acetylene-ethylene liquid mixtures of such composition that they do not freeze to any point in the column.

13. A process of separating ethylene from acetylene which comprises rectifying the mixture under conditions such as to cause the acetylene to be separated as a liquid and the ethylene as a gas, condensing the gaseous ethylene, and returning a portion of same to the rectification system for use as reflux therein.

14. A process of separating acetylene from admixture with components more volatile than acetylene which comprises rectifying the mixture under conditions so as to give a liquid fraction containing at least 25% acetylene, reducing the pressure on said liquid fraction so as to vaporize a portion of the acetylene and returning the acetylene-containing vapor to the rectifying system.

15. The process in accordance with claim 9 characterized in that the normal gaseous material introduced into said rectifying column is of similar composition to the material to be ultimately rectified except that acetylene is replaced with ethane.

16. The process for the recovery of acetylene from admixture with higher and lower boiling components which comprises treating the mixture so as to remove the higher boiling components, then cooling the acetylene-containing fraction in admixture with ethylene to such a degree that acetylene and ethylene will condense as a liquid and be separated from the lower boiling components, and rectifying the acetylene-ethylene mixture so as to separate acetylene as a liquid and ethylene as a gas, said rectification process being further characterized in that it is started by establishing a reflux comprising essentially ethylene in the rectifying system prior to the introduction of the acetylene-containing gas.

17. An apparatus for the separation of acetylene from admixture with higher and lower boiling components which comprises in combination means for separating the acetylene and the lower boiling components as a gas from the higher boiling components, a combined condenser and fractionator and a rectifying column, means for passing the acetylene and the lower boiling components from the first separation means to the combined condenser and fractionator, means for passing liquid ethylene into the top of the combined condenser and fractionator, thereby condensing the acetylene, means for withdrawing the mixture of ethylene and acetylene from the combined condenser and fractionator and introducing same into said rectifying column, means for withdrawing the ethylene from the top of the rectifying column as a gas coupled with means for converting said gas to a liquid and returning same to the combined condenser and fractionator, and means for recovering liquid acetylene from the base of the rectifier.

DALE F. BABCOCK.